(12) United States Patent
Bestgen et al.

(10) Patent No.: US 9,840,112 B2
(45) Date of Patent: Dec. 12, 2017

(54) COLLAPSIBLE TIRE, METHOD FOR COLLAPSING SAME, AND USE THEREOF

(75) Inventors: Luc Bestgen, Clermont-Ferrand (FR); Michel Ahouanto, Clermont-Ferrand (FR)

(73) Assignees: Compagnie Generale des Etablissements Michelin, Clermont-Ferrand (FR); Michelin Recherche et Technique, S.A., Granges-Paccot (CH)

( * ) Notice: Subject to any disclaimer, the term of this patent is extended or adjusted under 35 U.S.C. 154(b) by 544 days.

(21) Appl. No.: 14/232,558

(22) PCT Filed: Jun. 27, 2012

(86) PCT No.: PCT/EP2012/062493
§ 371 (c)(1),
(2), (4) Date: Mar. 21, 2014

(87) PCT Pub. No.: WO2013/007524
PCT Pub. Date: Jan. 17, 2013

(65) Prior Publication Data
US 2014/0215793 A1    Aug. 7, 2014

(30) Foreign Application Priority Data

Jul. 13, 2011 (FR) ...................................... 11 56414

(51) Int. Cl.
*B60C 15/04* (2006.01)
*B60C 3/08* (2006.01)
(Continued)

(52) U.S. Cl.
CPC ................ *B60C 3/08* (2013.01); *B60C 15/04* (2013.01); *Y10T 29/49826* (2015.01)

(58) Field of Classification Search
CPC ...... B60C 3/08; B60C 15/04; Y10T 29/49826
(Continued)

(56) References Cited

U.S. PATENT DOCUMENTS 3,515,197 A * 6/1970 Boileau ..................... B60C 9/20
152/209.5
3,540,510 A * 11/1970 Smithkey, Jr. ......... B29D 30/22
152/454

(Continued)

FOREIGN PATENT DOCUMENTS

| JP | 43-11556 | 5/1968 |
|---|---|---|
| JP | 52-22204 | 2/1977 |
| WO | 2010/100088 A1 | 9/2010 |

OTHER PUBLICATIONS

Web Search with Google web search, dated Mar. 14, 2017.*

(Continued)

*Primary Examiner* — Sarang Afzali
*Assistant Examiner* — Darrell C Ford
(74) *Attorney, Agent, or Firm* — Dickinson Wright, PLLC

(57) ABSTRACT

The collapsible tire includes at least one carcass reinforcement that is surmounted radially from the outside by an inextensible crown reinforcement, which is radially on an inside of a tread. The reinforcements each include at least one layer of reinforcing elements. The tread is connected to two beads by two sidewalls. The beads are intended to come into contact with a rim, and each bead has at least one circumferential reinforcing element called a bead wire. The bead wire defines a mean line which forms a substantially circular closed curve in a circumferential plane. The bead wires are flexible and have at least one concave part $P_c$ with a radius $R_c$ and a center of curvature $C_c$.

8 Claims, 8 Drawing Sheets

(51) Int. Cl.
*B60C 5/00* (2006.01)
*B60C 15/00* (2006.01)

(58) Field of Classification Search
USPC ............... 29/428; 152/457, 540; 245/1.5
See application file for complete search history.

(56) References Cited

U.S. PATENT DOCUMENTS

| | | | | |
|---|---|---|---|---|
| 3,570,572 A * | 3/1971 | Cardenas | ................ | B60C 5/00 152/457 |
| 3,789,899 A * | 2/1974 | Kobayashi | ......... | B29D 30/3021 152/510 |
| 4,039,015 A * | 8/1977 | Pakur | ................ | B60C 15/04 152/540 |
| 4,057,091 A * | 11/1977 | Gardner | ................ | B60C 3/08 152/457 |
| 4,116,255 A * | 9/1978 | Hayakawa | ............ | B29D 30/00 152/457 |
| 4,177,851 A * | 12/1979 | Gill | ................ | B60C 3/08 152/152 |
| 4,180,116 A * | 12/1979 | Maiocchi | ................ | B60C 15/04 152/540 |
| 4,238,259 A * | 12/1980 | Gill | ................ | B29D 30/00 152/457 |
| 4,261,406 A * | 4/1981 | Chemizard | ............ | B29D 30/00 152/152 |
| 4,343,343 A * | 8/1982 | Reuter | ................ | B29D 30/22 152/556 |
| 4,378,042 A * | 3/1983 | Inae | ................ | B29D 30/48 152/540 |
| 4,451,313 A * | 5/1984 | Jackson | ................ | B29D 30/08 152/525 |
| 4,817,696 A * | 4/1989 | Janus | ................ | B60C 15/04 152/540 |
| 4,917,162 A * | 4/1990 | De Longcamp | ......... | B60B 3/02 152/5 |
| 5,042,545 A * | 8/1991 | Kabe | ................ | B60C 3/04 152/454 |
| 5,368,082 A * | 11/1994 | Oare | ................ | B60C 13/00 152/517 |
| 5,795,418 A * | 8/1998 | Suzuki | ................ | B60C 9/09 152/526 |
| 5,837,073 A * | 11/1998 | Cauquot | ............... | B60B 21/104 152/158 |
| 5,879,482 A * | 3/1999 | Rooney | ............... | B60C 11/0316 152/209.16 |
| 5,961,756 A * | 10/1999 | Ahouanto | ............ | B60C 15/0018 152/539 |
| 5,968,296 A * | 10/1999 | Ahouanto | ................ | B60C 15/05 152/516 |
| 6,026,878 A * | 2/2000 | Zhang | ................ | B60C 9/04 152/454 |
| 6,129,129 A * | 10/2000 | Chandezon | ............... | B60C 9/08 152/548 |
| 6,260,596 B1 * | 7/2001 | Ubukata | ............... | B60C 9/2009 152/526 |
| 6,345,655 B1 * | 2/2002 | Kustas | ................ | B60C 3/08 152/450 |
| 6,397,911 B1 * | 6/2002 | Armellin | ................ | B60C 9/12 152/458 |
| 6,470,933 B1 * | 10/2002 | Volpi | ................ | B29D 30/48 152/152.1 |
| 6,977,020 B2 * | 12/2005 | Nakamura | ............ | B60C 9/2009 152/209.11 |
| 8,257,530 B2 * | 9/2012 | Nakagawa | ............... | B60C 11/00 152/209.11 |
| 2001/0025680 A1 * | 10/2001 | Ahouanto | ........... | B60C 15/0018 152/540 |
| 2001/0037847 A1 * | 11/2001 | Miyazaki | ............... | B60C 9/0007 152/527 |
| 2003/0150538 A1 * | 8/2003 | Ceretta | ................ | B60B 21/026 152/158 |
| 2004/0103968 A1 * | 6/2004 | Burlacot | ................ | B60C 9/023 152/555 |
| 2005/0045260 A1 * | 3/2005 | Maruoka | ............ | B60C 15/0027 152/541 |
| 2005/0109441 A1 * | 5/2005 | Sugiyama | ............... | B29D 30/32 152/540 |
| 2006/0102266 A1 * | 5/2006 | Ravasio | ................ | B60C 11/18 152/209.5 |
| 2008/0105351 A1 * | 5/2008 | Shepherd | ............ | B60C 17/0009 152/517 |
| 2008/0149249 A1 * | 6/2008 | Rahier | ................ | B60C 9/09 152/540 |
| 2010/0024938 A1 * | 2/2010 | Ishiyama | ................ | B60C 11/00 152/209.5 |
| 2010/0051158 A1 * | 3/2010 | Albert | ................ | B29C 73/18 152/503 |
| 2010/0163145 A1 * | 7/2010 | Nakagawa | ............ | B60C 11/00 152/209.5 |
| 2010/0175800 A1 * | 7/2010 | Nakagawa | ............ | B60C 11/00 152/209.5 |
| 2010/0201098 A1 * | 8/2010 | Fitzsimons | ............... | B60B 1/14 280/287 |
| 2010/0230029 A1 * | 9/2010 | Kawai | ................ | B60C 5/02 152/525 |
| 2010/0255226 A1 * | 10/2010 | Heffernan | ............ | A61M 29/02 428/34.1 |
| 2011/0030871 A1 * | 2/2011 | Bestgen | ................ | B60C 9/07 152/548 |
| 2011/0132514 A1 * | 6/2011 | Bestgen | ................ | B60C 9/07 152/548 |
| 2011/0308688 A1 * | 12/2011 | Bestgen | ................ | B60C 9/07 152/552 |
| 2012/0097722 A1 * | 4/2012 | Kahan | ................ | B62J 9/005 224/414 |
| 2012/0103495 A1 * | 5/2012 | Mercat | ................ | B60C 3/02 152/523 |
| 2013/0081745 A1 * | 4/2013 | Delgado | ................ | B60C 23/12 152/450 |
| 2015/0144272 A1 * | 5/2015 | Bestgen, Jr. | ............ | B60C 25/14 157/1.24 |
| 2015/0183269 A1 * | 7/2015 | Laurent | ................ | B60C 15/04 29/894.3 |

OTHER PUBLICATIONS

Allen, John S. "To Compact a Non-Folding Bicycle Tire for Storage" (2006), http://www.truewheelers.org/mechtips/ Viewed Mar. 14, 2017.*

Allen, John S. "To Compact a Non-Folding Bicycle Tire for Storage" (2006), recovered from the Internet Archive, viewed Mar. 14, 2017.*

The Japanese Office Action, along with an English Language translation, dated Apr. 11, 2016, issued in corresponding Japanese Patent Application No. 2014-519490.

International Search Report (PCT/ISA/210) dated Sep. 19, 2012, by the European Patent Office as the International Searching Authority for International Application No. PCT/EP2012/062493.

\* cited by examiner

COLLAPSIBLE TIRE, METHOD FOR COLLAPSING SAME, AND USE THEREOF

This application is a 371 of PCT/EP2012/062493, filed 27 Jun. 2012, which claims benefit of FR1156414, filed 13 Jul. 2011, the entire contents of each of which is incorporated by reference herein for all purposes.

BACKGROUND

1. Field

Disclosed herein is a collapsible radial or cross-ply tire, to a method of collapsing and to a use thereof on a passenger vehicle.

2. Description of Related Art

In what follows:
- a "circumferential plane" means a plane perpendicular to the axis of rotation of the tire,
- an "equatorial plane" means a circumferential plane passing through the middle of the tread surface of the tire, and
- a "radial plane" means a plane containing the axis of rotation of the tire,
- an "axial direction" means a direction parallel to the axis of rotation of the tire,
- a "radial direction" means a direction intersecting the axis of rotation of the tire and perpendicular thereto,
- a "circumferential direction" means a direction tangential to the surface of the tread in the direction of rotation of the tire,
- "radially on the inside of" means closer to the axis of rotation of the tire,
- "radially on the outside of" means further from the axis of rotation of the tire,
- "axially on the inside of" means closer to the equatorial plane,
- "axially on the outside of" means further away from the equatorial plane.

A tire comprises a tread intended to come into contact with the ground via a tread surface, extending radially towards the inside in the form of two sidewalls connected to two beads intended to provide the connection between the tire and a rim.

A radial tire more particularly comprises a reinforcing structure comprising a crown reinforcement, radially on the inside of the tread, and a radial carcass reinforcement, radially on the inside of the crown reinforcement.

A cross ply tire differs from a tire built with radial tire technology in that there are at least two crossed carcass plies making angles other than 90° with respect to the circumferential direction of the tire. The plies are said to be "crossed" because the angles are of opposite sign from one ply to the other.

The carcass reinforcement usually comprises at least one pair of reinforcing elements which consists of threads substantially parallel to one another and usually making, with the circumferential direction, an angle comprised between 85° and 95°. The carcass reinforcement is, in most tires, and in each bead, wound from the inside towards the outside of the tire around a circumferential reinforcing element called a bead wire to form a turn-up. The bead wire may be formed of an assembly of elementary threads or of cords, themselves formed of an assembly of elementary threads.

The crown reinforcement generally comprises several crown reinforcement layers. These layers most often consist of metal reinforcing elements embedded in an elastomeric material.

In the case of a tire for a passenger vehicle, the thickness of the crown reinforcement, which essentially consists of the radial stack of the crown reinforcement and of the carcass reinforcement, is usually comprised between 2 and 7 mm. A sidewall of a tire for a passenger vehicle generally has a thickness comprised between 2.6 and 7 mm.

A collapsible tire for a bicycle, comprising a carcass reinforcement each end of which is anchored in two beads by being turned up around a reinforcing element called a bead wire is already known from document WO 10/100088. Each bead is extended radially by sidewalls which join to a tread. This tire comprises a bead wire formed by winding a saturated and unwrapped metal cord formed of filaments.

A collapsible tire mounted on a rim, for vehicles such as motor vehicles, is also known, from document FR 2 348 065. This tire comprises a substantially annular tread situated centrally, and sidewalls which extend the tread and end in inextensible beads, which means beads the bead wire of which has a high level of circumferential rigidity. When the tire is deflated, the sidewalls can be bent inwards towards one another so as to be practically flattened inside the tire in relation to the tread.

Finally, document U.S. Pat. No. 4,057,091 also discloses the collapsing of a tire for a motor vehicle when it is mounted on a rim. In such a combination and when deflated, the tire can be flattened by folding its sidewalls in on themselves towards this rim.

However, such tire collapsing configurations for motor vehicles assume the rim still to be present, and still occupy a great deal of space and exhibit a high weight due to the presence of the rim.

Moreover, when the tires are manufactured at production sites distant from the sales sites it is necessary to transport them. When they are being transported, even if compressed together, the tires still occupy a substantial volume.

Specifically, one mode of packaging currently employed is first of all to lay a first row of tires vertically and in a line to make an angle of inclination with the ground so that they are partially superposed. Other tires are then incorporated and pushed into that part of the hole of each tire of the first row that has been left free, thus forming a second row. Such a mode of packaging allows 30% more tires to be packed in per $m^3$ by comparison with a layout in which the tires are placed side by side without deformation.

Hence, a need to be able to package one or more tires for a motor vehicle, not mounted on rims, in a more or less compact manner for the time they spend in transport and/or in storage, and without damaging their internal structure while at the same time allowing them to revert very quickly back to their initial shape when they are no longer collapsed still remains.

SUMMARY

One object of embodiments of the invention is therefore a collapsible tire for a vehicle, comprising at least one carcass reinforcement associated with an inextensible crown reinforcement, itself radially on the inside of a tread, the said reinforcements each consisting of at least one layer of reinforcing elements, the said tread being connected to two beads by two sidewalls, the said beads being intended to come into contact with a rim, each bead comprising at least one inextensible circumferential reinforcing element called a bead wire, the said bead wire defining, when free of any stress, a mean line forming a substantially circular closed curve in a circumferential plane, the said sidewalls having a thickness comprised between 2.6 and 7 mm and the said crown reinforcement having a thickness comprised between 2 and 7 mm. The invention is characterized in that the bead wire of each bead is flexible, and in that after the tire has been collapsed, the mean line of the bead wire comprises at least one concave part $P_c$ of smaller radius $R_c$ and of center of curvature $C_c$.

The subject matter of embodiments of the invention covers both tires comprising a crown reinforcement radially on the inside of the carcass reinforcement and tires comprising a crown reinforcement radially on the outside of the carcass reinforcement.

A bead wire is said to be flexible when, flexed in its plane about a pulley of 10 mm radius, none of the rigid elements of which it is made suffers permanent deformation.

According to embodiments of the invention, a crown reinforcement is inextensible when the load to deform it by 5% is at least egual to 40 N, and a bead wire is inextensible when the load to lengthen it by 1% is at least equal to 2500 N.

The concave part is defined by a center of curvature on the outside of the closed mean line of the bead wire. The convex part is defined by a center of curvature on the inside of the closed mean line of the bead wire.

The tire according to embodiments of the invention has the advantage that the number of tires per unit volume for tire transport and/or storage can be increased significantly, leading to substantial economic savings.

Specifically, the form of collapse according to embodiments of the invention allows tires to be stored with a 50% per m³ improvement notably on the mode of packaging known as lacing, explained earlier. The tire according to the invention can be collapsed and stored loose or in a case.

Another advantage of embodiments of the tire of the invention is that it can be collapsed in various ways and kept collapsed in that way, regardless of its size. Finally, the tire according to the invention can remain collapsed for the time it spends in transport and/or storage without any negative impact on its performance.

Another subject of embodiments of the invention is a first method for collapsing a tire as defined previously, which consists in:

parting, in a radial plane, the beads of a part of the tire along an axial direction towards an axis tangential to the center of the tread of the said part of the tire in the said radial plane, applying a force in a radial direction to the said tread so as to move it closer to the cavity opposite thus forming, in a circumferential plane, a tire that is collapsed substantially into the shape of an arc of a circle comprising a base that is connected with two axes.

The parting step means increasing the axial distance between the beads.

Another subject of embodiments of the invention is a second method for collapsing a tire as defined hereinabove which consists:

in parting, in a radial plane, the beads of a first part of the tire along an axial direction towards an axis tangential to the center of the tread and in applying a compression force in the radial direction to the said tread, it being possible for the said force to be applied at the same time as the beads are being parted and/or afterwards, in applying a first force $F_1$ in a first circumferential direction to the said tread so as to move the corresponding cavity closer to another part of the cavity of the tire, in parting, in a radial plane, the beads of a second part of the tire in an axial direction towards an axis tangential to the center of the tread, in applying, either simultaneously or not, the compression force in the radial direction to the said first and/or second part, and a second force $F_2$ in a second circumferential direction, of opposite sense to the said first force $F_1$ to the said tread so as to move the corresponding cavity closer to another part of the cavity of the tire.

Finally, a final subject of embodiments of the invention is a use of the tire as defined hereinabove for a passenger vehicle.

The mean line of the bead wire further comprises at least two points of inflexion $I_1$, $I_2$ delimiting the concave part $P_c$.

The mean line of the bead wire further comprises at least two convex parts $P_{x1}$, $P_{x2}$ having two smaller radii $R_{x1}$, $R_{x2}$ and two centers of curvature $C_{x1}$, $C_{x2}$. Preferably, straight lines $D_1$, $D_2$ respectively connecting the center of curvature $C_{c1}$ of the concave part $P_c$ to each of the centers of curvature $C_{x1}$, $C_{x2}$ of the convex parts form an angle $\alpha$ comprised between 30° and 125°.

The mean line of the bead wire of each bead is preferably formed by winding a metal cord, formed of filaments. The diameter of the cord is preferably less than 1.5 mm, and it is saturated and unwrapped. The diameter of the filaments is preferably less than 0.25 mm.

A cord is said to be "saturated" when it is impossible to add an additional filament between the filaments that form the said cord. It is said to be "unwrapped" when it has no additional filament wound in a helix on the external surface of the said cord. A wrapping filament is usually chosen to have a diameter less than that of the filaments of the cord and is wrapped at a short pitch and in a direction that is the opposite of or the same as the direction in which the threads that form the external surface of the cord are wound. The prime function of a wrap is to limit the buckling of the cord.

For preference also, the diameter of the threads or filaments that form the cord is less than 0.20 mm. Such filament diameters will further contribute to the flexibility of the cord and limit the load necessary to collapse the tire.

One advantageous embodiment of the invention makes provision for the tensile modulus of the cord to be greater than 150 GPa.

Advantageously also, the cord can be bent into a radius of curvature comprised between 2 and 5 mm without suffering any deformation that would render the tire unusable. For preference, it can be bent to a radius of curvature less than 3 mm without suffering deformation that would render the tire unusable.

According to one alternative form of the embodiment of the invention, the cord is a layered metal cord of [L+M] or [L+M+N] construction comprising a first layer C1 of L threads of diameter $d_1$ with L ranging from 1 to 4, surrounded by at least one intermediate layer C2 of M threads of diameter $d_2$ wound together in a helix at a pitch $p_2$ with M ranging from 3 to 12, the said layer C2 possibly being surrounded by an external layer C3 of N threads of diameter $d_3$, wound together in a helix at a pitch $p_3$, with N ranging from 8 to 20.

When L is equal to 1, the first layer forms a central core consisting of a metal thread of diameter $d_1$.

Advantageously, according to this alternative form of embodiment, the pitch $p_2$ and the pitch $p_3$ are identical.

Advantageously also according to this alternative form of embodiment, the cord is a 19.18 metal cord of formula 1+6+12, the layers being formed with the same direction of rotation and with identical pitches of 10 mm. Such a cord allows the formation of a bead wire by winding 3 to 16 turns. The number of turns required is dependent on the size of tire and its use.

According to a first alternative form, after the tire has been collapsed, the mean line of the bead wire comprises a concave part $P_c$ of smaller radius $R_{c1}$ and of center of curvature $C_{c1}$. The bead wire also comprises two convex parts $P_{x1}$, $P_{x2}$, respectively of smaller radii $R_{x1}$, $R_{x2}$, and of centers of curvature $C_{x1}$, $C_{x2}$. The straight lines $D_1$, $D_2$ respectively connecting the center of curvature $C_{c1}$ of the concave part $P_c$ to each of the centers of curvature $C_{x1}$, $C_{x2}$ of the convex part $P_x$ form an angle α comprised between 40 and 140°. The geometric shape of the collapsed tire in this first alternative form closely resembles a U-shape or a J-shape depending on whether the straight lines $D_1$ and $D_2$ are the same length or different lengths.

According to a second alternative form, for preference, after the tire has been collapsed, the mean line of the bead wire comprises a concave part $P_c$ of smaller radius $R_{c1}$ and of center of curvature $C_{c1}$. The bead wire comprises two convex parts $P_{x1}$, $P_{x2}$, respectively of smaller radii $R_{x1}$, $R_{x2}$, and of centers of curvature $C_{x1}$, $C_{x2}$. The straight lines $D_1$, $D_2$ respectively connecting the center of curvature $C_{c1}$ of the concave part $P_c$ to each of the centers of curvature $C_{x1}$, $C_{x2}$ of the convex part $P_x$ may form an angle α comprised between 30 and 55°, and are preferably of different lengths. The geometric shape of the collapsed tire according to this second alternative form of collapse closely resembles a spiral shape.

Finally, according to a last alternative form of the invention, after the tire has been collapsed, the mean line of the bead wire may comprise two concave parts $P_{c1}$, $P_{c2}$, respectively of smaller radii $R_{c1}$, $R_{c2}$ and of centers of curvature $C_{c1}$, $C_{c2}$. It also comprises two convex parts $P_{x1}$, $P_{x2}$, respectively of smaller radii $R_{x1}$, $R_{x2}$, and of centers of curvature $C_{x1}$, $C_{x2}$. The straight lines $D_1$, $D_2$ respectively connecting the center of curvature $C_{c1}$ of a concave part to each of the centers of curvature $C_{x1}$, $C_{x2}$ of the convex parts $P_{x1}$, $P_{x2}$ preferably form an angle α comprised between 95° and 125°, and are not the same length. The geometric shape of the collapsed tire according to this last alternative form closely resembles an S shape.

For each of the alternative forms, the range of values for the angle α makes it possible both to guarantee that the tire, for certain sizes, runs no risk of any impairment when left collapsed for a lengthy period of time and also guarantees a significant gain in the amount of compacting.

Whatever the shape into which it is collapsed, the ratio $D_1/D_2$ is preferably greater than or equal to 1 and less than 1.90 assuming that $D_1$ is greater than $D_2$ in terms of absolute value. The upper limit on this ratio is dependent on the size of the tire.

When collapsed into a more or less U-shape or J-shape, the ratio $D_1/D_2$ may be comprised between 1 and 1.60.

When collapsed into more or less a spiral shape, the ratio $D_1/D_2$ may be comprised between 1.0 and 1.80, and preferably higher than 1.30.

When collapsed into more or less an S shape, the ratio $D_1/D_2$ may be comprised between 1.20 and 1.90 and is preferably higher than 1.35.

The tire according to the invention preferably, after collapse, occupies a volume less than 65% per $m^3$ by comparison with the lacing mode of packaging.

The invention will now be illustrated with the aid of various detailed embodiments that follow and which do not in any way limit the subject matter of the invention.

BRIEF DESCRIPTION OF DRAWINGS

The various measurements that follow have been taken on tires, collapsed according to the invention, of different sizes.

DETAILED DESCRIPTION OF SPECIFIC EMBODIMENTS

Figure 1:
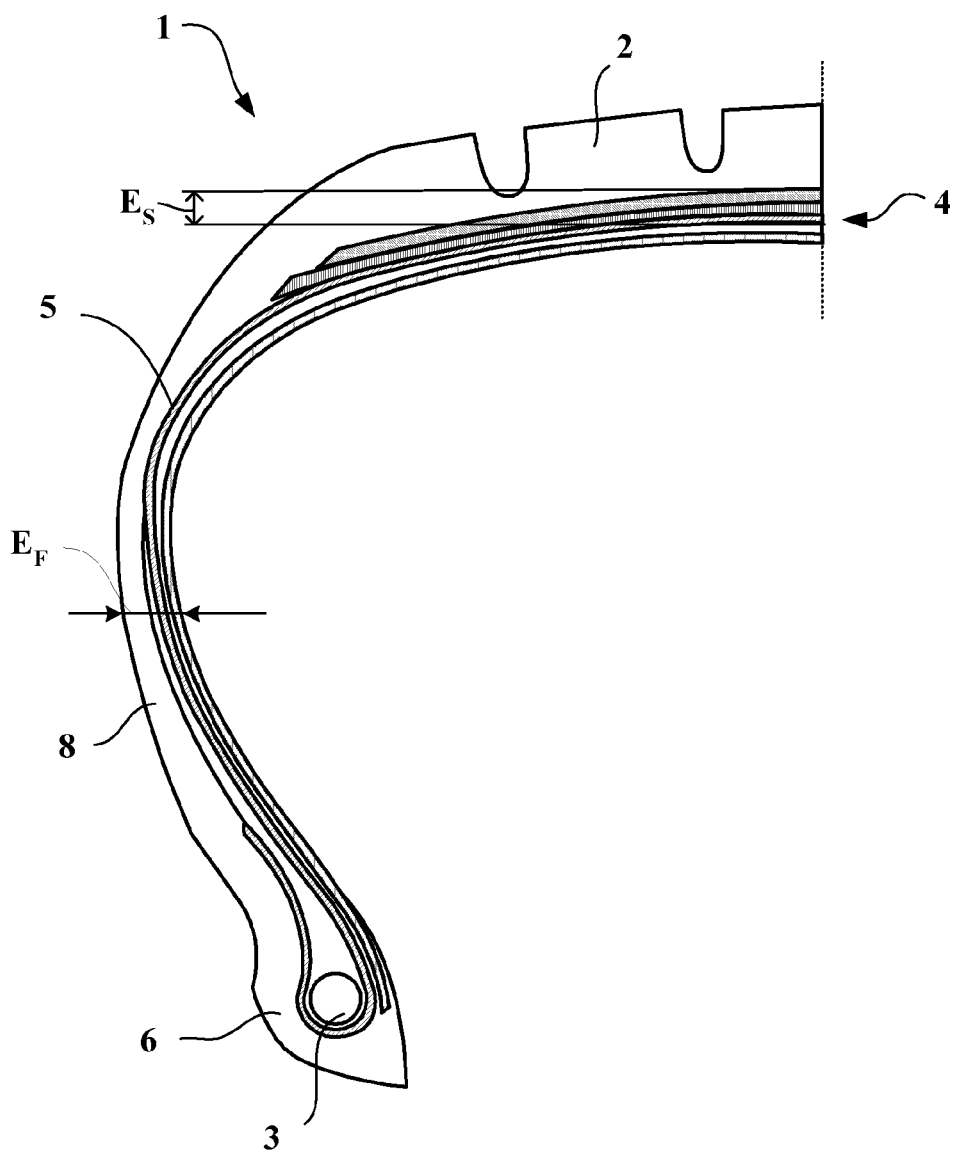
FIG. 1 depicts a schematic view in section on a radial plane, of half a tire in the uncollapsed state.

FIG. 1 depicts a passenger vehicle tire, of general reference 1, in the uncollapsed state, comprising a tread 2 extended radially inwards by two sidewalls 8 connected to two beads 6, the said beads comprising a bead wire 3 (reinforcing element) (not depicted).

FIG. 1 depicts a tread 2 radially furthest towards the outside. Radially on the inside of the said tread 2 there are, in succession, an inextensible crown reinforcement 4 and a carcass reinforcement 5.

The said crown 4 and carcass 5 reinforcements are each made up of at least one layer of reinforcing elements (not depicted). The tread 2 is connected to two beads 6 by two sidewalls 8. Each bead 6 comprises at least one bead wire 3. This bead wire 3, which defines a mean line forming a substantially circular closed curve in a circumferential plane is inextensible and flexible.

The bead wire is preferably made of steel, and takes the form of a saturated and unwrapped cord formed of filaments; the said filaments being of a diameter equal to 0.18 mm. The cord is a 19.18 metal cord of formula 1+6+12, the layers being formed with the same direction of rotation and with identical pitches equal to 10 mm. Such a cord can be used to form a bead wire by winding 3 to 16 turns. The number of turns required is dependent on the size of the tire and its use.

The mean thickness $E_F$ of the sidewall of the tire according to the invention, measured at the point located in the middle, in the radial direction, between the high point of the bead wire and the low point of the tire on the equatorial plane, is comprised between 2.6 and 7 mm.

The mean thickness $E_S$ of the crown reinforcement 4, measured in the equatorial plane, is comprised between 2 and 7 mm.

Figure 2:
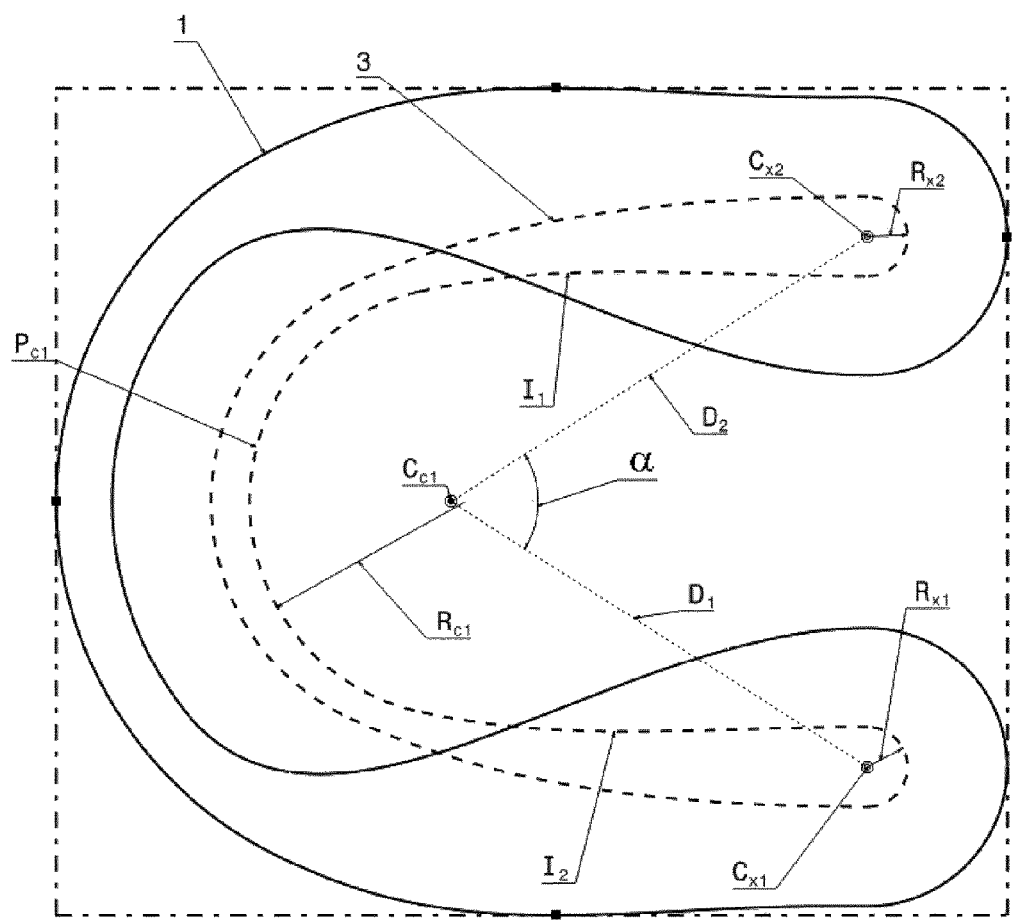
FIG. 2 depicts a schematic view in cross section on a circumferential plane of the collapsed tire of the invention according to a first embodiment.

In FIG. 2, the mean line of the bead wire 3 (depicted in dotted line) of the tire, of trade reference 185/65 R 14, collapsed according to a first mode of collapse, roughly into a U shape, has a concave part $P_{c1}$ of smaller radius $R_{c1}$ equal to 69 mm and a center of curvature $C_{c1}$.

The mean line of the bead wire 3 comprises, on the one hand, two points of inflexion $I_1$, $I_2$ which delimit the concave part $P_{c1}$ and, on the other hand, two convex parts $P_{x1}$, $P_{x2}$ having two smaller radii $R_{x1}$ equal to 18 mm and $R_{x2}$ equal to 18 mm and two centers of curvature $C_{x1}$ and $C_{x2}$.

Two straight lines $D_1$ and $D_2$ which respectively connect the center of curvature $C_{c1}$ and concave part $P_{c1}$ to each of the centers of curvature $C_{x1}$ and $C_{x2}$ of the convex part $P_{x1}$ form an angle α of around 52°. In this mode of collapse the straight lines $D_1$ and $D_2$ are substantially the same length, and measure 170 mm.

In another alternative form of this same mode of collapse according to FIG. 2 of the tire of the same reference as previously, the two straight lines $D_1$ and $D_2$ which respectively connect the center of curvature $C_{c1}$ of the concave part $P_{c1}$ to each of the centers of curvature $C_{x1}$, $C_{x2}$ of the convex part $P_{x1}$, have different lengths. $D_1$ is equal to 197 mm, $D_2$ is equal to 135 mm; the ratio $D_1/D_2$ is equal to 1.45 and the angle α is equal to 65°.

Having been collapsed according to this first mode of collapse, the tires can also be nested in one another or even possibly laced. Lacing makes it possible to keep them compressed.

Table I below collates other measurements taken on the form of collapse depicted in FIG. 2.

TABLE I

| Size of tire | Sidewall thickness (in mm) $E_F$ | Crown reinforcement thickness (in mm) $E_S$ | Angle α (in degrees) | $D_1$ (in mm) | $D_2$ (in mm) | $R_{c1}$ (in mm) | $R_{x1}$ (in mm) | $R_{x2}$ (in mm) | $D_1/D_2$ |
|---|---|---|---|---|---|---|---|---|---|
| 175/70 R 13 | 3.7 | 3.2 | 51 | 138 | 138 | 77 | 16 | 16 | 1 |
| 185/65 R 14 | 4.5 | 2.7 | 61 | 170 | 170 | 68 | 18 | 18 | 1 |
| 185/65 R 14 | 4.5 | 2.7 | 65 | 197 | 135 | 69 | 17 | 17 | 1.45 |
| 195/65 R 15 | 4.8 | 3.7 | 124 | 156 | 156 | 111 | 30 | 30 | 1 |
| 205/55 R 16 | 5 | 3.7 | 55 | 168 | 168 | 78 | 18 | 18 | 1 |
| 225/55 R 17 | 5 | 3.2 | 45 | 189 | 189 | 96 | 16 | 16 | 1 |

Figure 3:
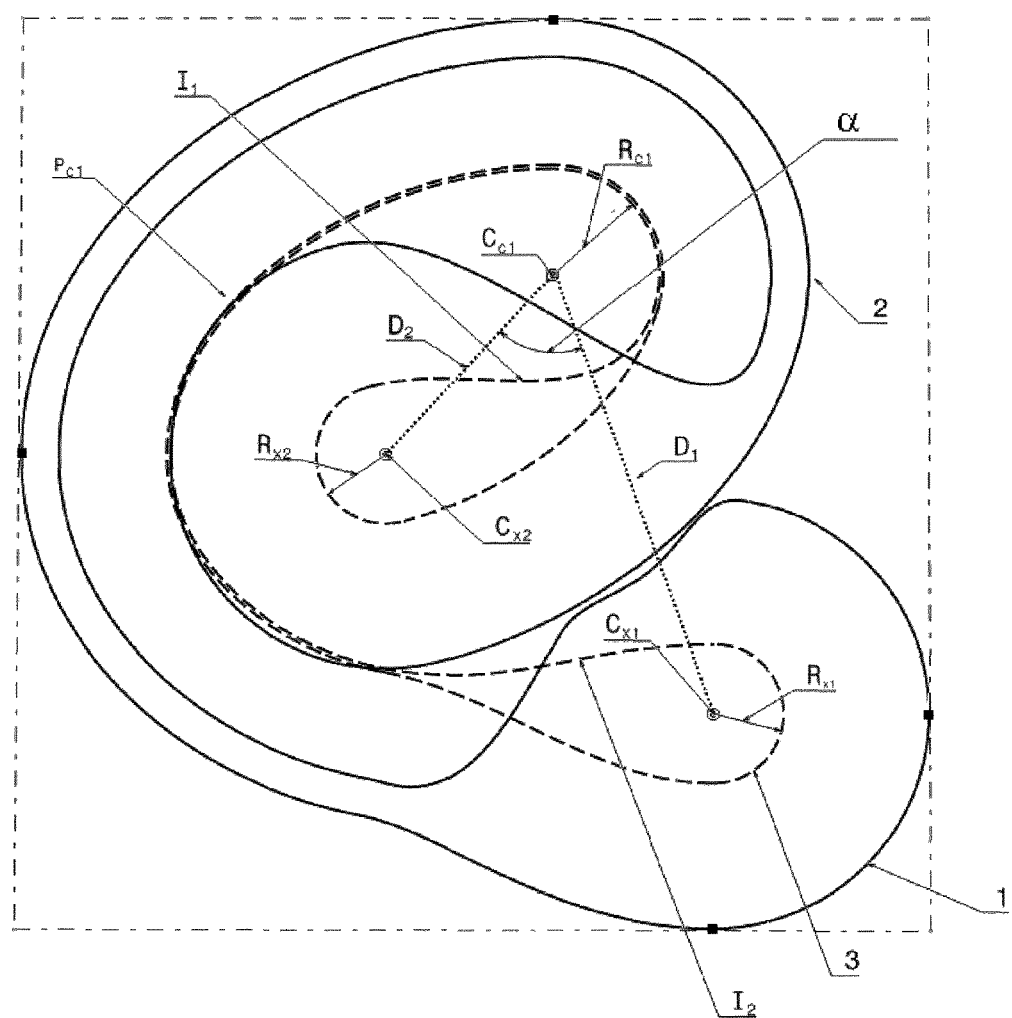
FIG. 3 depicts a schematic view in cross section on a circumferential plane of the collapsed tire of the invention according to a second embodiment.

The collapsing of the tire 1 as depicted in FIG. 3 differs from that of FIG. 2 in that the straight lines $D_1$ and $D_2$ form an angle α comprised between 38° and 57°, and in that they do not have the same length. The collapsing as depicted in FIG. 4 closely resembles the shape of a spiral.

The volume occupied by the tire is less than 85%, preferably less than 75% of the volume occupied by tires collapsed according to the currently known modes of packaging.

Table II below collates the measurements taken on various tires according to the form of collapse depicted in FIG. 3.

Figure 4:
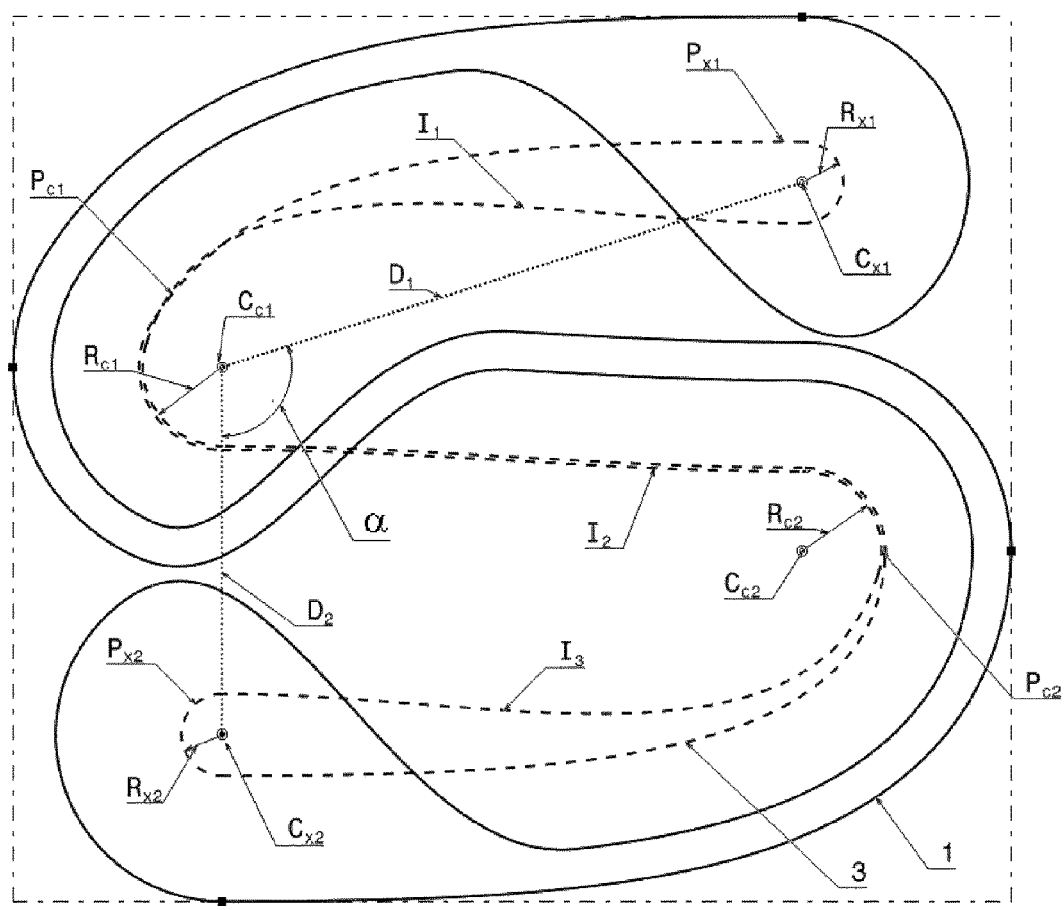
FIG. 4 depicts a schematic view in cross section on a circumferential plane, of the collapsed tire according to the invention, according to a third embodiment.

In FIG. 4, the mean line of the bead wire 3 comprises three points of inflexion $I_1$, $I_2$ and $I_3$ which delimit a concave part from a convex part and vice versa.

According to this third mode of collapse, the straight lines $D_1$ and $D_2$ which respectively connect the center of curvature $C_{c1}$ of a concave part $P_{c1}$ to each of the centers of curvature $C_{x1}$, $C_{x2}$ of the convex parts $P_{x1}$ and $P_{x2}$ form an angle α comprised between 95° and 125°. The straight lines $D_1$ and $D_2$ are not of the same length.

TABLE II

| Size of tire | Sidewall thickness (in mm) $E_F$ | Crown reinforcement thickness (in mm) $E_S$ | Angle α (in degrees) | $D_1$ (in mm) | $D_2$ (in mm) | $R_{c1}$ (in mm) | $R_{x1}$ (in mm) | $R_{x2}$ (in mm) | $D_1/D_2$ |
|---|---|---|---|---|---|---|---|---|---|
| 175/70 R 13 | 3.7 | 3.2 | 42 | 125 | 83 | 29 | 19 | 19 | 1.50 |
| 185/65 R 14 | 4.5 | 2.7 | 38 | 135 | 83 | 25 | 15 | 15 | 1.63 |
| 195/65 R 15 | 4.5 | 2.7 | 42 | 136 | 93 | 26 | 16 | 16 | 1.46 |
| 205/55 R 16 | 4.8 | 3.7 | 37 | 154 | 94 | 27 | 17 | 17 | 1.64 |
| 225/55 R 17 | 5 | 3.7 | 46 | 149 | 110 | 24 | 14 | 14 | 1.35 |

The third mode of collapsing the tire 1, as depicted in FIG. 4, differs from that of FIG. 2 in that the mean line of the bead wire 3 comprises two concave parts $P_{c1}$, $P_{c2}$. The concave parts $P_{c1}$ and $P_{c2}$ are characterized by a smaller radius.

The mean line of the bead wire 3 also comprises two convex parts $P_{x1}$, $P_{x2}$ respectively having a smaller radius $R_{x1}$ equal to 11 mm, and $R_{x2}$ equal to 11 mm, and respectively having a center of curvature $C_{x1}$, $C_{x2}$.

The volume occupied by the tire is less than 80%, preferably less than 70% by comparison with the volume occupied by tires collapsed according to currently known modes of compacting.

Table III below collates the measurements taken on various tires according to the form of collapse depicted in FIG. 4.

TABLE III

| Size of tire | Sidewall thickness (in mm) $E_F$ | Crown reinforcement thickness (in mm) $E_S$ | Angle α (in degrees) | $D_1$ (in mm) | $D_2$ (in mm) | $R_{c1}$ (in mm) | $R_{x1}$ (in mm) | $R_{x2}$ (in mm) | $D_1/D_2$ |
|---|---|---|---|---|---|---|---|---|---|
| 175/70 R 13 | 3.7 | 3.2 | 112 | 122 | 92 | 20 | 10 | 10 | 1.33 |
| 185/65 R 14 | 4.5 | 2.7 | 111 | 132 | 96 | 21 | 11 | 11 | 1.37 |
| 195/65 R 15 | 4.5 | 2.7 | 112 | 136 | 103 | 25 | 15 | 15 | 1.32 |
| 205/55 R 16 | 4.8 | 3.7 | 106 | 159 | 89 | 22 | 12 | 12 | 1.78 |
| 225/55 R 17 | 5 | 3.7 | 112 | 153 | 112 | 22 | 12 | 12 | 1.36 |

In order to obtain a collapsed tire according to the invention, there are two conceivable methods of collapsing.

Figure 5A:
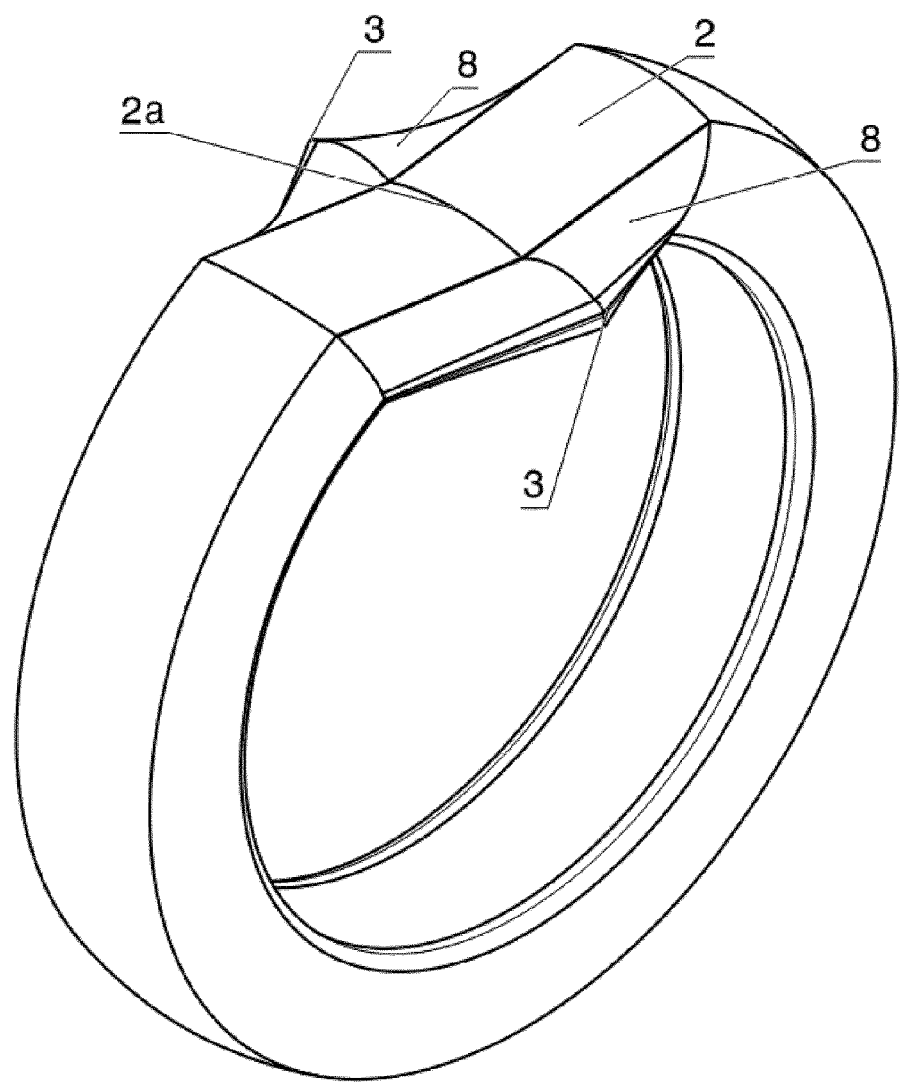
FIGS. 5A and 5B depict a schematic three-dimensional view of the various steps of a first method of collapsing.

The first method of collapsing results in the collapsed tire according to the invention indicated schematically in FIGS. 2 and 3. This method is indicated schematically in FIGS. 5A and 5B. As FIG. 5A shows, this method consists, in a radial plane, in parting the beads 6 towards an axis tangential to the center 2a of the tread 2 in the said radial plane.

Figure 5B:
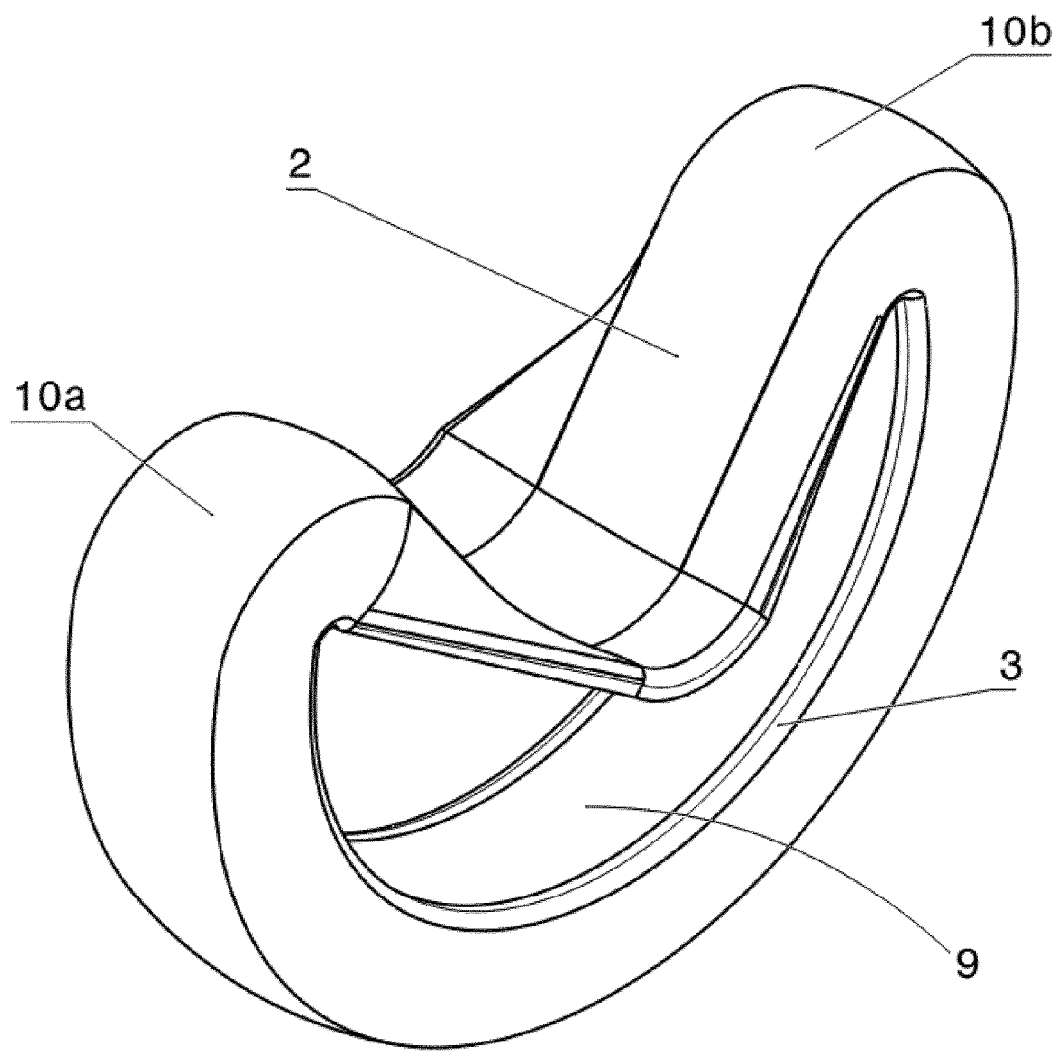

FIG. 5B shows that, in a radial direction, a force is applied to the said tread 2 either at the same time as the parting step and/or afterwards, so as to move this tread closer to the cavity 9 opposite. This then yields, in a circumferential plane, a tire that is collapsed substantially into the shape of semicircle and closely resembles a U shape. This shape in the form of an arc of a circle comprises two substantially vertical axes 10a and 10b which, when bent over on one another indiscriminately, yield the collapsed configuration of FIG. 3 which closely resembles a spiral.

The second method of collapsing the tire results in the collapsed tire according to the invention indicated schematically in FIG. 4.

Figure 6A:
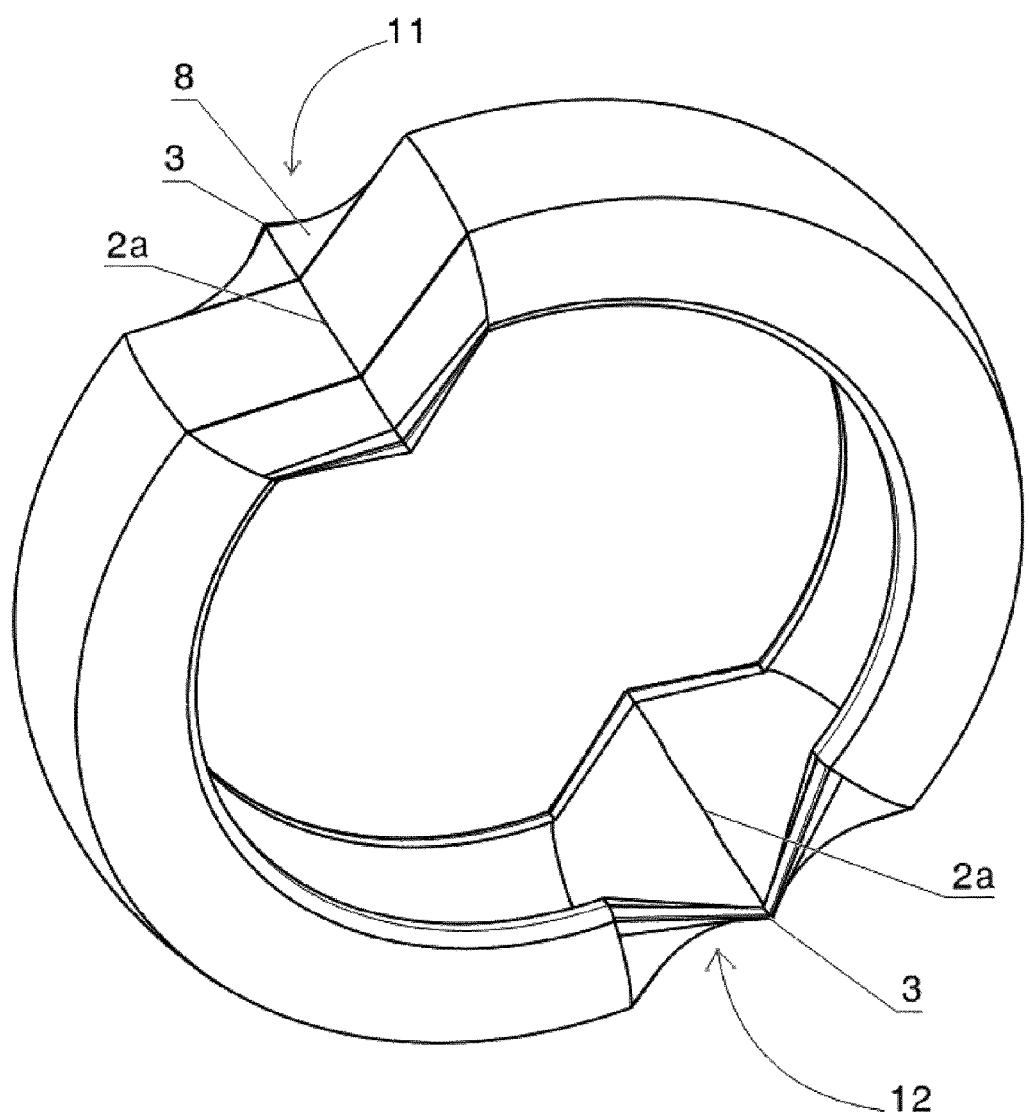
FIGS. 6A and 6B depict a schematic three-dimensional view of the various steps of a second method of collapsing.
Figure 6B:
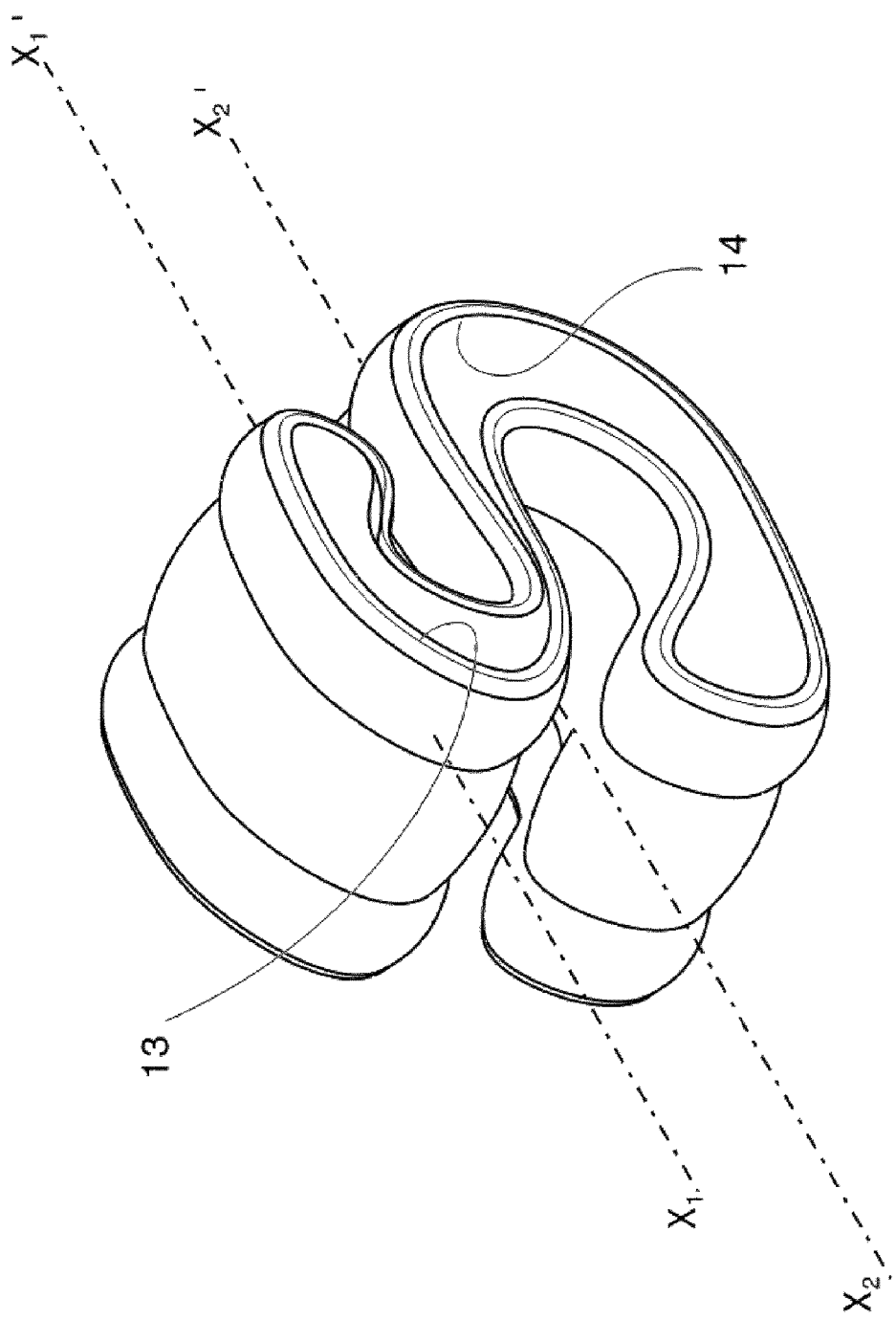

This method is indicated schematically by FIGS. 6A and 6B. According to this second method of collapse, and as shown in FIG. 6A, the beads 6 of a first part 11 of the tire are, in a radial plane, parted in an axial direction towards an axis tangential to the center 2a of the tread 2. Also, the beads 6 of the second part 12 of the tire are, in a radial plane, parted in an axial direction towards an axis tangential to the center 2a of the tread 2.

A compression force is applied in a radial direction to said tread 2 of the first part 11. The said force may be applied at the same time as the beads 6 are being parted and/or afterwards.

As FIG. 6B shows, a first compression force $F_1$ is applied, simultaneously or otherwise, in a first circumferential direction $X_1$-$X_1'$ to the tread 2 in order to move it closer to the cavity 13 opposite. As FIG. 6B also shows a second compression force $F_2$ is applied, simultaneously or otherwise, in a second circumferential direction $X_2$-$X_2'$.

A second force $F_2$ is applied in a second circumferential direction parallel to the first force $F_1$, so as to move it closer to the cavity 14. The forces $F_1$ and $F_2$ are of opposite sense.

The compression force applied in the radial direction may be applied simultaneously with the second force $F_2$ or non-simultaneously therewith.

The tire collapsed according to this mode of collapse is more or less S-shaped.

The invention claimed is:

1. A collapsed tire for a vehicle, comprising:
   a carcass that has a width which is at least 175 mm,
   at least one carcass reinforcement associated with an inextensible crown reinforcement,
   the at least one carcass reinforcement being disposed radially on the inside of a tread,
   the reinforcements each comprising at least one layer of reinforcing elements,
   the tread being connected to two beads by two sidewalls,
   the beads being intended to come into contact with a rim,
   each bead comprising at least one inextensible circumferential reinforcing element called a bead wire,
   the sidewalls having a thickness between 2.6 and 7 mm and the crown reinforcement having a thickness between 2 and 7 mm,
   wherein the bead wire of each bead is flexible, and
   a mean line of each bead wire extending through a non-overlapping, closed-loop and non-circular shape in a circumferential plane, and said non-overlapping, closed-loop and non-circular shape defining at least one concave part ($P_c$) with a radius ($R_c$) with a center of curvature ($C_c$).

2. The tire according to claim 1, wherein the mean line of each bead wire further defines at least two points of inflexion ($I_1$, $I_2$) delimiting the at least one concave part ($P_c$).

3. The tire according to claim 1, wherein the closed-loop, non-circular shape of each mean line of each bead wire approximates an S-shape which has two convex parts ($P_{x1}$, $P_{x2}$) having two radii ($R_{x1}$, $R_{x2}$) and having two centers of curvature ($C_{x1}$, $C_{x2}$), and wherein straight lines ($D_1$, $D_2$) respectively connect the center of curvature ($C_{c1}$) of the concave part ($P_c$) to each of the centers of curvature ($C_{x1}$, $C_{x2}$) of the convex parts ($P_{x1}$, $P_{x2}$) and wherein the straight lines ($D_1$, $D_2$) are angled relative to one another at an angle α that is between 30° and 125°.

4. The tire according to claim 1, wherein the mean line of the bead wire of each bead is formed by winding a metal cord, formed of filaments, which is saturated and unwrapped, wherein the diameter of the cord is less than 1.5 mm and wherein the diameter of the filament is less than 0.25 mm.

5. The tire according to claim 1, wherein the closed-loop, non-circular shape of each mean line of each bead wire approximates an S-shape which has two convex parts ($P_{x1}$, $P_{x2}$), respectively with smaller radii ($R_{x1}$, $R_{x2}$) than the radius ($R_c$) of the at least one concave part ($P_c$), and having centers of curvature ($C_{x1}$, $C_{x2}$), and wherein straight lines ($D_1$, $D_2$) respectively connect the center of curvature ($C_{c1}$) of the concave part ($P_c$) to each of the centers of curvature ($C_{x1}$, $C_{x2}$) of the convex parts ($P_{x1}$, $P_{x2}$) and wherein the straight lines ($D_1$, $D_2$) are angled relative to one another at an angle α that is between 40 and 140°.

6. A plurality of the collapsed tires set forth in claim 1, wherein when stored, the tires occupy a volume that is less than 65% by comparison with a lacing mode of packaging tires.

7. A method for collapsing a tire with at least one carcass reinforcement associated with an inextensible crown reinforcement,
- a carcass with a width that is at least 175 mm,
- the at least one carcass reinforcement being disposed radially on the inside of a tread,
- the reinforcements each comprising at least one layer of reinforcing elements,
- the tread being connected by two beads by two sidewalls,
- the beads being intended to come into contact with a rim,
- each bead comprising at least one inextensible circumferential reinforcing element called a bead wire, and
- the sidewalls having a thickness between 2.6 and 7 mm and the crown reinforcement having a thickness between 2 and 7 mm,
- comprising the steps of:
  - parting, in a radial plane, the beads of a part of the tire along an axial direction towards an axis tangential to the center of the tread of the tire in the said radial plane,
  - applying a force in a radial direction to the said tread so as to move the tread closer to a cavity opposite the force to collapse the tire into the shape of a double-walled arc of a circle comprising a base that is connected with two axes such that a mean line of each bead wire extends through a non-overlapping, closed-loop and non-circular shape in a circumferential plane and defines at least one concave part ($P_c$) with a radius ($R_c$) and with a center of curvature ($C_c$).

8. A method for collapsing a tire with at least one carcass reinforcement associated with an inextensible crown reinforcement,
- a carcass with a width that is at least 175 mm,
- the at least one carcass reinforcement being disposed radially on the inside of a tread,
- the reinforcements each comprising at least one layer of reinforcing elements,
- the tread being connected by two beads by two sidewalls,
- the beads being intended to come into contact with a rim,
- each bead comprising at least one inextensible circumferential reinforcing element called a bead wire, and
- the sidewalls having a thickness between 2.6 and 7 mm and the crown reinforcement having a thickness between 2 and 7 mm,
- comprising the steps of:
  - parting, in a radial plane, the beads of a first part of the tire along an axial direction towards an axis tangential to the center of the tread,
  - applying a first force (F1) in a first circumferential direction to the said tread so as to move a corresponding cavity closer to another part of the cavity of the tire,
  - parting, in a radial plane, the beads of a second part of the tire in an axial direction towards an axis tangential to the center of the tread,
  - applying a compression force in the radial direction to the said first and/or second part, and a second force (F2) in a second circumferential direction, of opposite sense to the said first force (F1) to the said tread so as to move the corresponding cavity closer to another part of the cavity of the tire such that a mean line of each bead wire extends through a non-overlapping, closed-loop and non-circular shape in a circumferential plane and defines at least one concave part ($P_c$) with a radius ($R_c$) and with a center of curvature ($C_c$), and
- continuing to apply the compression force until the non-overlapping, closed-loop and non-circular shape of the mean line of each bead wire when the tire is collapsed is a double-walled arc shape or an S-shape.

* * * * *